United States Patent [19]

Tenney

[11] 4,136,248

[45] Jan. 23, 1979

[54] RING-OPENED ALKYLNORBORNENE COPOLYMERS

[75] Inventor: Linwood P. Tenney, Hudson, Ohio

[73] Assignee: The B. F. Goodrich Company, Akron, Ohio

[21] Appl. No.: 857,142

[22] Filed: Dec. 5, 1977

[51] Int. Cl.$^2$ .................. C08F 236/00; C08F 36/00; C08F 2/38; C08F 4/60

[52] U.S. Cl. .................................... 526/283; 526/84; 526/169; 526/281; 526/282; 526/916

[58] Field of Search .............................. 526/280.3, 916

[56] References Cited

U.S. PATENT DOCUMENTS

| | | | |
|---|---|---|---|
| 3,879,343 | 4/1975 | DeBrunner et al. | 526/281 |
| 4,002,815 | 1/1977 | Minchak | 526/916 |
| 4,025,497 | 5/1977 | Matta et al. | 526/282 |
| 4,025,708 | 3/1977 | Minchak et al. | 526/283 |

*Primary Examiner*—Herbert J. Lilling
*Attorney, Agent, or Firm*—Charles A. Crehore

[57] ABSTRACT

At least one alkylnorbornene, wherein the alkyl group contains from 8 to 12 carbon atoms, is copolymerized by ring opening with (1) at least one acyclic monoolefin or nonconjugated acyclic olefin and (2) optionally, dicyclopentadiene. These copolymers have substantially lower glass transition temperatures than lower alkylnorbornene copolymers and can be injection molded to make appliance housings and the like, or calendered and thermoformed to make, for example, automotive goods such as glovebox covers and the like.

10 Claims, No Drawings

RING-OPENED ALKYLNORBORNENE COPOLYMERS

BACKGROUND OF THE INVENTION

Cycloolefins can be polymerized through the olefin structure to yield polycycloaliphatics, or through a ring-opening process to yield unsaturated linear polymers. The latter process has particular appeal since the resulting polymers are sulfur-vulcanizable. Cyclopentene is a readily available ethylene production by-product, and considerable art has focused on the ring-opening polymerization and copolymerization of cyclopentene. Dicyclopentadiene is another readily available ethylene production by-product, but not as much consideration has been given in the prior art to dicyclopentadiene polymers. Recent U.S. Patents directed to cyclopentene and dicyclopentadiene polymers include U.S. Pat. Nos. 3,778,420, 3,781,257, 3,790,545, 3,853,830 and 4,002,815.

Norbornene (bicyclo[2.2.1]-hept-2-ene) and substituted norbornenes can be produced by Diels-Alder reaction of cyclopentadiene with selected olefins. U.S. Pat. No. 3,074,918 is directed to polymerization of cyclic olefins having at least one unsubstituted ring double bond and not more than one double bond in each ring, such as dicyclopentadiene, 1,2-dihydrodicyclopentadiene, norbornene, or substituted norbornenes. Other U.S. Patents directed to norbornene and substituted norbornene polymers include U.S. Pat. Nos. 2,721,189, 2,831,037, 2,932,630, 3,330,815, 3,367,924, 3,467,633, 3,546,183, 3,836,593, 3,879,343, and 4,020,021.

Polymers of dicyclopentadiene alone or with acyclic monoolefins or nonconjugated acyclic olefins have excellent glass transition temperatures but are difficult to process. Polymers of norbornene or lower alkylnorbornenes (containing 1 to 6 carbon atoms per alkyl group) with acyclic monoolefins or nonconjugated acyclic olefins process more easily but are still not sufficiently rubbery for some applications, i.e., their glass transition temperatures are higher then desired.

New alkylnorbornene copolymers are desired having both satisfactory processability and lower glass transition temperatures.

SUMMARY OF THE INVENTION

At least one alkylnorbornene wherein the alkyl group contains from 8 to 12 carbon atoms is copolymerized by ring opening with (1) a minor amount of at least one acyclic monoolefin or nonconjugated acyclic olefin and (2) optionally, from 0 to about 95 wt.% of dicyclopentadiene, based upon total copolymer weight. These copolymers have significantly lower glass transition temperatures than lower alkylnorbornene copolymers wherein the alkyl group contains 1 to 6 carbon atoms.

DETAILED DESCRIPTION

At least one alkylnorbornene wherein the alkyl group contains from 8 to 12 carbon atoms is copolymerized with (1) a minor amount of at least one nonconjugated acyclic olefin and (2) optionally, from 0 to about 95 wt.%, preferably from 50 to about 95 wt.%, and more preferably from 70 to about 95 wt.% of dicyclopentadiene, based upon total polymer weight. Suitable alkylnorbornenes wherein the alkyl group contains 8 to 12 carbon atoms include octylnorbornene, decylnorbornene and dodecylnorbornene, with dodecylnorbornene being preferred. Such alkylnorbornene monomers can be manufactured readily by Diels-Alder reaction of cyclopentadiene with selected olefins. For example, the Diels-Alder reaction of cyclopentadiene with 1-decene and 1-dodecene produces octylnorbornene and decylnorbornene respectively, and Diels-Alder reaction of cyclopentadiene with 1-tetradecene produces dodecylnorbornene.

At least one acyclic monoolefin or nonconjugated acyclic olefin is used having at least one hydrogen on each double bonded carbon atom and containing 2 to 12 carbon atoms, more preferably 2 to 8 carbon atoms. It is believed that the acyclic olefins act as molecular weight modifiers which are required for the production of an easily workable and generally hydrocarbon-soluble polymer. By easily workable is meant millable and otherwise readily thermoplastic upon heating. Examples of suitable acyclic monoolefins include normal and branched 1-olefins such as 1-butene and 3-methyl-1-butene; 2-olefins such as 2-pentene and 4-methyl-2-pentene; and 3-olefins such as 5-ethyl-2-octene. Nonconjugated acyclic normal and branched olefins include diolefins such as 1,6-hexadiene; triolefins such as 1,4,7-octatriene; and the like. The preferred acyclic monoolefins are the 1-olefins of the type described above. Excellent results were obtained using 1-butene and normal 1-hexene.

The acyclic monoolefin or nonconjugated acyclic olefin or a mixture of such olefins is used in a molar ratio of olefin to total alkylnorbornene and dicyclopentadiene from about 0.0001/1 to about 0.5/1, preferably from about 0.01 to about 0.3/1.

Although the exact nature of the copolymeric structure is not understood, it is believed to be a linear, unsaturated polymer containing groups primarily of the following types in random order, where m and n are numbers which are proportional to the concentrations of the alkylnorbornene and dicyclopentadiene, respectively, one X is an alkyl group containing from 8 to 12 carbon atoms, and the remaining X's are hydrogen:

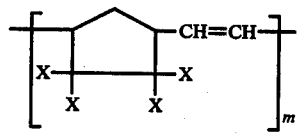

and

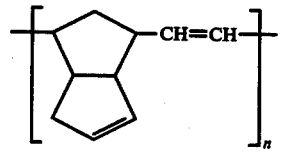

Minor amounts, i.e., up to about 20 wt.%, of still another olefinically unsaturated comonomer may also be used, including other norbornenes such as 2-norbornene (bicyclo[2.2.1]-hept-2-ene), 5-methyl-2-norbornene, 5-ethyl-2-norbornene, and 5-vinyl-2-norbornene; and tetracyclododecene compounds having the formula

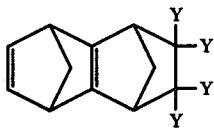

wherein Y is hydrogen or an alkyl group containing 1 to 20 carbon atoms, preferably from about 1 to 12 carbon atoms. Such tetracyclododecene compounds are typically by-products of the Diels-Alder reaction used to prepare norbornenes and may be present at varying levels depending upon reaction conditions used (e.g., dimethyltetracyclododecene in dimethylnorbornene).

A preferred catalyst for preparation of the copolymers of this invention comprises (1) a molybdenum or tungsten salt and (2) a dialkylaluminum iodide, an alkylaluminum diiodide, or a mixture of a trialkylaluminum compound with an iodine source.

Examples of useful molybdenum and tungsten salts include the halides such as chlorides, bromides, iodides, and fluorides. Specific examples of such halides include molybdenum pentachloride, molybdenum hexachloride, molybdenum pentabromide, molybdenum hexabromide, molybdenum pentaiodide, molybdenum hexafluoride, tungsten hexachloride, tungsten hexafluoride and the like. Other representative salts include those of acetylacetonates, sulfates, phosphates, nitrates, and the like. Mixtures of salts can also be used. The more preferred salts are the molybdenum halides, especially molybdenum pentahalides. Excellent results were obtained using $MoCl_5$.

The alkylaluminum compounds used in combination with the molybdenum or tungsten salts may be dialkylaluminum iodides, alkylaluminum diiodides, or a mixture of a trialkylaluminum compound with an iodine source. Each alkyl group may contain from 2 to about 12 carbon atoms, preferably from 2 to about 4 carbon atoms. Specific examples of such compounds include diethylaluminum iodide, ethylaluminum diiodide, propylaluminum diiodide and ethylpropylaluminum iodide. A mixture of a trialkylaluminum compound and an iodine source such as elemental iodine may also be used wherein each alkyl group is as defined above, e. g., a mixture of triethylaluminum and elemental iodine. Other iodine sources include methylene diiodide, potassium iodide, titanium tetraiodide, and the like. Excellent results were obtained using diethylaluminum iodide.

The molybdenum or tungsten salt is generally employed at a level from about 0.01 to about 50 millimoles per mole of total monomer, preferably from about 0.5 to about 10 millimoles per mole of total monomer. The organoaluminum compounds described above are generally used in a molar ratio of organoaluminum compound to molybdenum and/or tungsten salt(s) from about 10/1 to about 1/3, preferably from about 5/1 to about 3/1. Elemental iodine, when used, may be used in the range from about 0.1 mole to about 10 moles of iodine per mole of organoaluminum compound. When other sources of iodine are employed, sufficient iodine source is incorporated to provide the above concentration of elemental iodine in the catalyst.

In a preferred embodiment, the molybdenum or tungsten salt is dissolved in a solvent prior to incorporation into the polymerization mixture. In the absence of a solvent for the molybdenum or tungsten salt, the polymerization proceeds with some difficulty due to the presence of insoluble portions of salt. A preferred solvent for the molybdenum or tungsten salt comprises at least one alkyl ester of a saturated carboxylic or dicarboxylic acid. Use of an ester solvent has been found to produce a brief induction period of about 1 to about 5 minutes after addition of the molybdenum or tungsten salt to the monomer mixture. Such an induction period allows addition of all components of the reaction mixture before substantial polymerization begins. The result is more uniform process control and, ultimately, substantially gel-free polymers which are more readily recovered from the reaction vessel and are more easily processable than gelled polymers.

Suitable alkyl esters of saturated carboxylic or dicarboxylic acids typically contain from 2 to about 20 carbon atoms and may be substituted by 0 to 3 halogen atoms, preferably 0 or 1 halogen atoms. More preferably the ester solvent contains from 2 to 10 carbon atoms and 0 or 1 bromine or chlorine atoms, even more preferably 2 to 5 carbon atoms. The ester solvent should be liquid under a given set of reaction conditions in order to maintain the molybdenum or tungsten salt in solution during the reaction. The concentration of the molybdenum or tungsten salt in the ester solvent typically is from about 0.1 molar to about 1 molar. Examples of suitable alkyl esters of saturated carboxylic or dicarboxylic acids include methyl formate, ethyl formate, methyl chloroformate, ethyl chloroformate, butyl chloroformate, methyl acetate, ethyl acetate, isopropyl acetate, n-propyl acetate, n-butyl acetate, sec-butyl acetate, t-butyl acetate, isoamyl acetate, n-amyl acetate, hexyl acetate, methyl bromoacetate, ethyl bromoacetate, t-butyl bromoacetate, ethyl chloroacetate, methyl propionate, ethyl propionate, ethyl 2-bromopropionate, ethyl 3-bromopropionate, methyl 2-chloropropionate, ethyl butyrate, ethyl 2-bromobutyrate, ethyl 4-bromobutyrate, ethyl 2-bromoisobutyrate, methyl 4-chlorobutyrate, ethyl 4-chlorobutyrate, ethyl isovalerate, methyl 5-bromovalerate, ethyl 2-bromovalerate, ethyl 5-bromovalerate, methyl 5-chlorovalerate, ethyl caproate, ethyl octanoate, ethyl decanoate, ethyl laurate, diethyl oxalate, dimethyl malonate, diethyl malonate, diethyl methylmalonate, diethyl ethylmalonate, diethyl n-butylmalonate, diethyl dimethylmalonate, diethyl diethylmalonate, diethyl bromomalonate, diethyl chloromalonate, diethyl succinate, diethyl glutarate, diethyl pimelate, diethyl suberate, adipic acid monomethyl ester, and the like.

Examples of more preferred solvents containing from 2 to 10 carbon atoms and 0 or 1 bromine or chlorine atoms include methyl formate, ethyl formate, methyl chloroformate, ethyl chloroformate, butyl chloroformate, methyl acetate, ethyl acetate, isopropyl acetate, n-propyl acetate, n-butyl acetate, sec-butyl acetate, t-butyl acetate, isoamyl acetate, n-amyl acetate, hexyl acetate, methyl bromoacetate, ethyl bromoacetate, t-butyl bromoacetate, ethyl chloroacetate, methyl propionate, ethyl propionate, ethyl-2-bromopropionate, ethyl 3-bromopropionate, methyl 2-chloro-propionate, ethyl butyrate, ethyl 2-bromobutyrate, ethyl 4-bromobutyrate, ethyl 2-bromoisobutyrate, methyl 4-chlorobutyrate, ethyl 4-chlorobutyrate, ethyl isovalerate, methyl 5-bromovalerate, ethyl 2-bromovalerate, ethyl 5-bromovalerate, methyl 5-chlorovalerate, ethyl caproate, ethyl octanoate, diethyl oxalate, dimethyl malonate, diethyl malonate, diethyl methylmalonate, diethyl ethylmalonate, diethyl dimethylmalonate, diethyl bromomalonate, diethyl chloromalonate, diethyl succinate, diethyl glutarate, adipic acid monomethyl ester, and the like.

Examples of even more preferred solvents containing from 2 to 5 carbon atoms and 0 or 1 bromine or chlorine atoms include methyl formate, ethyl formate, methyl chloroformate, ethyl chloroformate, butyl chloroformate, methyl acetate, ethyl acetate, isopropyl acetate, n-propyl acetate, methyl bromoacetate, ethyl bromoacetate, ethyl chloroacetate, methyl propionate, ethyl propionate, ethyl 2-bromopropionate, ethyl 3-bromopropionate, methyl 2-chloropropionate, dimethyl malonate, and the like. Excellent results were obtained with ethyl acetate.

The above ester solvents may be used together with at least one inert cosolvent. The cosolvent typically constitutes from 0% to about 90% by weight of the total catalyst solvent weight. Additional cosolvent may also be used during polymerization. The additional cosolvent is typically up to about 500 times and more, preferably up to about 150 times, the total catalyst solvent weight. Suitable inert cosolvents include aliphatic or cycloaliphatic hydrocarbon cosolvents containing about 4 to 10 carbon atoms such as pentane, hexane, heptane, octane, cyclohexane, cyclooctane, and the like; aromatic hydrocarbon cosolvents containing about 6 to 14 carbon atoms and which are liquid or easily liquified such as benzene, toluene, naphthalene and the like; and substituted hydrocarbons wherein the substituents are inert, such as dichloromethane, chloroform, chlorobenzene and the like. Benzene and toluene are excellent cosolvents.

A polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide.

The activator may be employed in a range from about 0 moles to about 3 moles per mole of organoaluminum compound, more preferably from about 0 to about 1 mole per mole. The activator may be added at any point in the charging procedure, but it is more preferably added last.

The monomers may be added at any point in the charging procedure. A preferred charging procedure is as follows. The monomers and solvent(s) are added first to the reactor vessel. These ingredients may be added separately or as a mixture. The alkylaluminum iodide compound, or mixture of trialkylaluminum compound and iodine source, is added next, usually as a solution in a cosolvent such as benzene or toluene described heretofore. The molybdenum or tungsten salt is added next as a solution in a mixture of cosolvent and ester solvent described heretofore, followed by the activator if used.

Monomeric impurities such as water (in amounts larger than suitable for use as an activator) and the like should be removed prior to addition of the molybdenum or tungsten compound. The alkylaluminum iodide compound or mixture of trialkylaluminum compound and iodine source may be used to titrate the monomers or mixture of monomers and solvent until a color change from pink to colorless or slightly yellow is noted. A catalytically effective amount of alkylaluminum iodide compound or a mixture of trialkylaluminum compound and iodine source may then be added, followed by addition of the molybdenum or tungsten compound. The end point of the titration is typically difficult to pinpoint exactly. With minor impurities present, up to ten times the catalytically effect amount and more of the alkylaluminum iodide or mixture of trialkylaluminum compound and iodine source may be required to render the impurities harmless.

The mixing of catalyst components and the polymerization are preferably carried out in an inert atmosphere such as nitrogen and in the substantial absence of air or water. The polymerization may be performed as a batch or continuous operation and is conducted under sufficient pressure to keep the monomers and solvents in liquid state, the pressure required depending upon the reaction temperature. The particular ester solvent system selected must be liquid under the reaction conditions used. The reaction mixture in the reactor may be cooled or heated to polymerization temperature at the start of the additions or at any point during addition of the various reactants. Generally, polymerization temperatures from about $-80°$ C. to about 100° C. can be used, although the reaction generally proceeds especially well at about 20° C. to 75° C. The polymerization may be short-stopped by addition of alcohols, amines, alkanolamines or carboxylic acids such as ethanol, diethylamine, ethanolamine, acetic acid, and the like.

At the conclusion of the polymerization, the copolymers may be isolated by any method known to the art such as by direct drying under reduced pressure, by coagulation and precipitation using an alcohol such as methanol, ethanol, isopropanol and the like, or by steam or hot water stripping. The polymer is recovered and may be washed further with water or an alcohol and then dried.

As indicated heretofore, copolymers of alkylnorbornenes (containing 8 to 12 carbon atoms per alkyl group) with an acyclic monoolefin or nonconjugated acyclic olefin have glass transition temperatures significantly lower than polymers made using lower alkyl (C1 to 6) norbornenes such as methylnorbornene, hexylnorbornene and the like. Such substantially lower glass transition temperature effects were particularly surprising in view of the very rigid polymeric backbone contributed by the norbornene ring portion of the alkylnorbornene monomer. Glass transition temperatures of terpolymers of (1) an alkylnorbornene wherein the alkyl group contains from 8 to 12 carbon atoms, (2) an acyclic monoolefin or nonconjugated acyclic olefin, and (3) dicyclopentadiene also are affected similarly, although the magnitude of effect is offset by the high glass transition temperature contribution of dicyclopentadiene.

The copolymers of this invention are high molecular weight products having dilute solution viscosities (DSV) ranging from about 0.2 to about 6, more generally from about 0.5 to about 3. By dilute solution viscosity is meant a value obtained using the following formula:

$$DSV = \frac{\ln (t/t_o)}{c}$$

wherein $t_o$ is toluene flow time and t is flow time of a polymer solution in toluene (both measured at 25° C. in toluene using an Ostwald-Fenske viscometer), and c is the concentration of the polymer solution (measured in grams of polymer per deciliter of toluene at 25° C.). In this case c was 0.25 gram of polymer per deciliter of toluene. The DSV is regarded as a measure of molecular weight and is reported in units of deciliters/gram.

The following examples illustrate the present invention more fully.

EXAMPLES

I. Test Methods

In each of the following examples dilute solution viscosity (DSV) was measured as defined heretofore. Glass transition temperature ($T_g$) was measured by differential scanning calorimetry using a Dupont 990 Thermal Analyzer in a nitrogen atmosphere and at a 20° C./minute heat rate. Vicat softening temperature ($T_s$) was determined according to ASTM D1525–76 using Rate B rate of temperature rise.

Gardner impact strength was tested by a method similar to ASTM D-2444, but using a 5/16 inch radius tup rather than the ¼ inch tup C, and using a flat test sheet rather than rigid pipe. A 2 or 4 lb. weight was dropped from varying heights onto the tup, which rested on the test sheet. The test sheet in turn lay flat upon a ⅝ inch diameter retaining ring. Failure occurred when the impacted tup poked a hole in the test sheet, or when the test sheet shattered. Gardner impact strength was the maximum work per thousandth inch of test sheet thickness (inch-pound/mil) capable of being impacted on the test sheet without failure.

II. Polymer Preparations

Reactant Solutions

In each of the following examples if the principal cosolvent was benzene, then selected other reagents were likewise dissolved in benzene. Similarly, if toluene was the principal cosolvent, certain other reagents were dissolved in toluene.

0.25 Molar diethylaluminum iodide solutions in dry benzene and in dry toluene were prepared. 14.9 grams normal 1-hexene was diluted to 100 ml in dry benzene and also in dry toluene. $MoCl_5$/ethyl acetate/dry benzene and $MoCl_5$/ethyl acetate/dry toluene solutions (0.05 molar $MoCl_5$ and 3.0 molar ethyl acetate in dry benzene and dry toluene) were prepared and aged. Also used were a 20 wt.% solution of 2-norbornene in dry benzene, and a 10 wt.% solution of 1-butene in dry benzene.

"Solution A" was a commercially available solution of 500 vol. parts ethanol, 5.2 vol. parts methanol, 10 vol. parts isopropanol, and 1 vol. part methyl isobutyl ketone. Solution A was used in the shortstopping and coagulation steps of the polymerizations.

EXAMPLE 1

5-Dodecyl-2-Norbornene/1-Hexene Copolymer 50 ml dry benzene cosolvent, 5 ml 5-dodecyl-2-norbornene, 2 ml of the 1-hexene solution and 0.6 ml of the diethylaluminum iodide solution were charged to a dry, nitrogen-purged 7 oz. bottle with shaking. 0.75 ml of the $MoCl_5$ solution was charged last, and the bottle was shaken. Polymerization occurred rapidly, and after about 1 hour the reaction was shortstopped with ethanolamine and Solution A. The polymer was recovered by coagulating, filtering, and vacuum drying and found to be a solid, ring-opened 5-dodecyl-2-norbornene/1-hexene copolymer having a DSV (as defined heretofore) of about 1.23.

EXAMPLE 2

5-Decyl-2-Norbornene/1-Hexene Copolymer 50 ml dry toluene cosolvent, 7 ml decylnorbornene, 0.8 ml of the 1-hexene solution, and 0.9 ml of the diethylaluminum iodide solution were charged to a dry, nitrogenpurged 7 oz. bottle. 1.1 ml of the $MoCl_5$ solution was charged last, and the bottle was shaken. After 1 hour the reaction was shortstopped using a mixture of 0.1 ml ethanolamine and 0.5 ml Solution A. No antioxidant was added. The polymer cement was coagulated using excess Solution A in a Waring blender. About 4.5 grams of a solid, ring-opened 5-decyl-2-norbornene/1-hexene copolymer was recovered by filtering and vacuum drying.

EXAMPLE 3

5-Octyl-2-Norbornene/1-Hexene Copolymer 50 ml dry toluene cosolvent, 7 ml 5-octyl-2-norbornene (containing about 15 wt.% dicyclopentadiene trimer impurity), 8 ml 1-hexene solution, and 0.6 ml diethylaluminum iodide solution were charged to a dry nitrogen-purged 7 oz. bottle. 0.75 ml of the $MoCl_5$ solution was charged last. After about 1 hour the reaction was shortstopped using a mixture of ethanolamine, Solution A and 2 ml of an antioxidant solution (0.1 g/ml of 2,2′-methylenebis[4-methyl-6-t-butylphenol] in toluene). The polymer cement was coagulated using excess Solution A in a Waring blender. The solid recovered after being filtered and vacuum dried at 60° C. was found to be a terpolymer of octylnorbornene, dicyclopentadiene trimer and 1-hexene. $T_g$ was measured and the value adjusted to compensate for the trimer impurity.

EXAMPLE 4

5-Hexyl-2-Norbornene/1-Hexene Copolymer 50 ml dry toluene cosolvent, 7 ml 5-hexyl-2-norbornene, 0.5 ml 1-hexene solution, and 0.6 ml diethylaluminum iodide solution were charged to a dry, nitrogen-purged 7 oz. bottle. 0.75 ml of the $MoCl_5$ solution was charged last. After about 1 hour the reaction was shortstopped using a mixture of ethanolamine, Solution A and antioxidant solution. The polymer cement was coagulated using excess Solution A in a Waring blender. A solid weighing more than 5 grams was recovered after being filtered and vacuum dried at 60° C. It was a ring-opened 5-hexyl-2-norbornene/1-hexene copolymer having a DSV of about 1.03.

EXAMPLE 5

5-Butyl-2-Norbornene/1-Hexene Copolymer 50 ml dry toluene cosolvent, 7 ml 5-butyl-2-norbornene, 0.5 ml 1-hexene solution, and 0.6 ml diethylaluminum iodide solution were charged to a dry, nitrogen-purged 7 oz. bottle. 0.75 ml of the $MoCl_5$ solution was shortstopped using a mixture of 0.1 ml ethanolamine, 0.5 ml Solution A and 1 ml of an antioxidant solution (0.1 g/ml of 2,2′-methylenebis-[4-methyl-6-t-butylphenol] in toluene). The polymer cement was coagulated using excess Solution A in a Waring blender. A solid weighing 6.4 grams was recovered after being filtered and vacuum dried at 60° C. It was found to be a ring-opened 5-butyl-2-norbornene/1-hexene copolymer having a DSV of about 0.88.

EXAMPLE 6

5-Ethyl-2-Norbornene/1-Hexene Copolymer 50 ml dry toluene cosolvent, 7 ml 5-ethyl-2-norbornene, 0.8 ml 1-hexene solution, and 0.6 ml diethylaluminum iodide solution were charged to a dry, nitrogen-purged 7 oz. bottle. 0.75 ml of the $MoCl_5$ solution was charged last, and the bottle was shaken. After 1 hour the reaction was shortstopped using a mixture of 0.8 ml ethanolamine, 3 ml Solution A and 25 ml toluene. 2 ml of an antioxidant solution was added (0.1 g/ml of 2,2'-methylenebis[4-methyl-6-t-butylphenol] in toluene). The polymer cement was coagulated using excess Solution A in a Waring blender. A solid weighing 5.9 grams was recovered after being filtered and vacuum dried at 60° C. It was found to be a ring-opened 5-ethyl-2-norbornene/1-hexene copolymer with a DSV of about 1.53.

EXAMPLE 7

5-Methyl-2-Norbornene/1-Hexene Copolymer 500 ml dry benzene cosolvent, 74 ml 5-methyl-2-norbornene, 12 ml of the 1-hexene solution, and 6 ml of the diethylaluminum iodide solution were charged to a dry, nitrogen-purged quart bottle. 7.5 ml of the $MoCl_5$ solution was charged last, and the bottle was shaken. After 80 minutes the reaction was shortstopped using a mixture of 1.5 ml ethanolamine, 10 ml of antioxidant solution (10 grams of 2,2',2"-tris[3(3,5-di-t-butyl-4-hydroxyphenyl)propionyloxy]ethyl isocyanurate in 100 ml benzene), and 1.5 ml Solution A. The polymer cement was coagulated using excess Solution A in a Waring blender. A solid weighing 66.0 grams was recovered after being filtered and vacuum dried at 60° C. It was found to be a ring-opened 5-methyl-2-norbornene/1-hexene copolymer having a DSV of about 1.90.

EXAMPLE 8

2-Norbornene/1-Butene Copolymer 500 ml dry benzene cosolvent, 77 ml 2-norbornene solution, 10 ml of the 1-butene solution, and 6 ml of the diethylaluminum iodide solution were charged to a dry, nitrogen-purged quart bottle. 7.5 ml of the $MoCl_5$ solution was charged last, and the bottle was shaken. Polymerization occurred so rapidly that the reaction was terminated after 7-8 minutes using a mixture of 1.5 ml ethanolamine, 10 ml of an antioxidant solution (10 grams of 2,2',2"-tris[3(3,5-di-t-butyl-4-hydroxyphenyl)propionyloxy] ethyl isocyanurate in 100 ml benzene) and 1 ml ethanol. The polymer cement was allowed to stand for about 12 hours and coagulated using excess Solution A in a Waring blender. A slightly yellow solid formed and was filtered and vacuum dried at 60° C. The solid weighed 57.4 grams after drying. It was a ring-opened 2-norbornene/1-butene copolymer having a DSV of about 2.3.

EXAMPLES 9-11

5-Decyl-2-Norbornene/1-Hexene/Dicyclopentadiene Copolymers

A 2/1 molar ratio of 5-decyl-2-norbornene to dicyclopentadiene was used as follows to prepare the 5-decyl-2-norbornene/1-hexene-dicyclopentadiene copolymer of example 9. 500 ml dry toluene cosolvent, 67.1 ml 5-decyl-2-norbornene, 17.6 ml dicyclopentadiene solution (90 wt.% in dry toluene), 9 ml of the 1-hexene solution and 6 ml of the diethylaluminum iodide solution were charged to a dry, nitrogen-purged quart bottle. 7.5 ml of the $MoCl_5$ solution was charged last, and the bottle was shaken. Polymerization occurred rapidly, and after 1 hour the reaction was cooled to room temperature and shortstopped using a mixture of 1 ml ethanolamine and 3 ml Solution A. 6 ml of an antioxidant solution was also added (0.1 g/ml of Ethyl 330 in toluene; Ethyl 330 is 1,3,5-trimethyl-2,4,6-tris [3,5-di-5-butyl-4-hydroxybenzyl] benzene. The polymer cement was allowed to stand for between 24 and 48 hours and then washed twice with 2 liters water per wash. Each water wash was discarded. An additional 6 ml of the above antioxidant solution was added to the washed cement, which then was coagulated using Solution A in a Waring blender. A white solid formed and was filtered and vacuum dried at 60° C. The solid weighed 69.1 grams after drying. It was found to be a ring-opened 5-decyl-2-norbornene/1-hexene/dicyclopentadiene copolymer having a DSV of about 1.25.

5-Decyl-2-norbornene/1-hexene/dicyclopentadiene copolymers were prepared by the above method with 1/1 (example 10) and 1/2 (example 11) decylnorbornene/dicyclopentadiene (DCPD) molar ratios using the following recipes respectively:

| Material | Recipe Amounts for 1/1-Decylnor-bornene/DCPD Molar Ratio | Recipe Amounts for 1/2 Decylnor-bornene/DCPD Molar Ratio |
| --- | --- | --- |
| Dry toluene | 500 ml | 500 ml |
| Decylnorbornene | 54.9 ml | 40.2 ml |
| DCPD solution | 28.8 ml | 42.2 ml |
| 1-Hexene solution | 9 ml | 9 ml |
| Diethylaluminum iodide solution | 6 ml | 6 ml |
| $MoCl_5$ solution | 7.5 ml | 7.5 ml |

The latter two polymers weighed 66.8 grams and 64.9 grams respectively. Both were ring-opened 5-decyl-2-norbornene/1-hexene/dicyclopentadiene copolymers having DSV's of about 1.67 and 2.15 respectively.

III. Test Data

EXAMPLES 1 TO 8

Examples 1 to 3 demonstrate that the glass transition temperatures for dodecylnorbornene/1-hexene, decylnorbornene/1-hexene, and octylnorbornene/1-hexene copolymers respectively were significantly lower (about −20° C. to −26° C.) than glass transition temperatures of homologous 5-alkyl-2-norbornene/1-hexene copolymers (examples 4 to 8). Glass transition temperatures for the homologous copolymers were much higher and ranged from 51° C. to −6° C.

Test data is summarized in TABLE I.

TABLE I

| Example | Alkylnorbornene Monomer | Number of Carbon Atoms in Alkyl Group of Alkylnorbornene Monomer | Glass Transition Temperature ($T_g$) of Copolymer, °C. |
|---|---|---|---|
| 1 | 5-Dodecyl-2-norbornene | 12 | −24 |
| 2 | 5-Decyl-2-norbornene | 10 | −26 |
| 3 | 5-Octyl-2-norbornene | 8 | −20 to −25* |
| 4 | 5-Hexyl-2-norbornene | 6 | − 6 |
| 5 | 5-Butyl-2-norbornene | 4 | 17 |
| 6 | 5-Ethyl-2-norbornene | 2 | 41 |
| 7 | 5-Methyl-2-norbornene | 1 | 46 |
| 8 | Norbornene | 0 | 51 |

*Measured $T_g$ adjusted to compensate for the presence of dicyclopentadiene trimer impurity.

EXAMPLES 9 to 11

Examples 9 through 11 demonstrate the preparation and general properties of decylnorbornene/1-hexene/dicyclopentadiene copolymers.

Copolymer test data is summarized in Table II.

TABLE II

| Example | Decylnorbornene/Dicyclopentadiene Molar Ratio | Dilute Solution Viscosity (DSV) | Gardner Impact in-lbs/mil at 27° C. | Vicat ($T_s$), °C. |
|---|---|---|---|---|
| 9 | 2/1 | 1.25 | 0.49 | * |
| 10 | 1/1 | 1.67 | 1.03 | 51 |
| 11 | 1/2 | 2.15 | 1.44 | 46 |

*Too soft to measure.

The copolymers of this invention are thermoplastics which can be compounded and, if desired, cured with conventional fillers, extenders, plasticizers, antioxidants, oil extenders, cure accelerators, crosslinking or curing agents, pigments and stabilizers. The copolymers and compounds therefrom can be injection molded to make appliance housings and the like, or calendered and thermoformed to make, for example, automotive goods such as glovebox covers and the like.

I claim:

1. A ring-opening polymerized copolymer comprising polymerized units of (a) at least one alkylnorbornene wherein the alkyl group contains from 8 to 12 carbon atoms, (b) dicyclopentadiene in an amount from 0 to about 95 wt.% based upon total copolymer weight, and (c) from about 0.0001 to about 0.5 mole of at least one acyclic monoolefin or nonconjugated acyclic olefin per mole of total alkylnorbornene and dicyclopentadiene, said acyclic monoolefin or nonconjugated acyclic olefin containing from 2 to 12 carbon atoms and having at least one hydrogen on each double-bonded carbon atoms, said copolymer containing groups primarily of the following types in random order, where m and n are numbers which are proportional to the concentrations of the alkylnorbornene and dicyclopentadiene respectively, one X is an alkyl group containing from 8 to 12 carbon atoms, and the remaining X's are hydrogen:

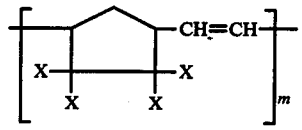

and

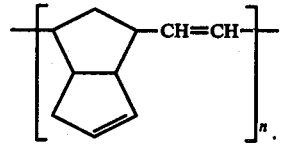

2. A copolymer of claim 1 containing polymerized units of dicyclopentadiene in an amount from 50 to about 95 wt.% based upon total copolymer weight.

3. A copolymer of claim 2 containing polymerized units of dicyclopentadiene in an amount from 70 to about 95 wt.% based upon total copolymer weight.

4. A copolymer of claim 1 wherein said acyclic monoolefin is a 1-olefin or 2-olefin containing from 2 to 8 carbon atoms.

5. A copolymer of claim 4 wherein said monomer (a) is octylnorbornene.

6. A copolymer of claim 5 wherein octylnorbornene is 5-octyl-2-norbornene, and said 1-olefin is 1-butene or 1-hexene.

7. A copolymer of claim 4 wherein said monomer (a) is decylnorbornene.

8. A copolymer of claim 7 wherein said decylnorbornene is 5-decyl-2-norbornene, and said 1-olefin is 1-butene or 1-hexene.

9. A copolymer of claim 4 wherein said monomer (a) is dodecylnorbornene.

10. A copolymer of claim 9 wherein said dodecylnorbornene is 5-dodecyl-2-norbornene, and said acyclic olefin is 1-butene or 1-hexene.

* * * * *